United States Patent [19]

Holtrop et al.

[11] Patent Number: 4,476,183
[45] Date of Patent: Oct. 9, 1984

[54] THERMOFORMABLE LAMINATE STRUCTURE WITH IMPROVED ACOUSTICAL ABSORPTION

[75] Inventors: James S. Holtrop, South Windsor, Conn.; Richard P. Maurer, Wilbraham, Mass.

[73] Assignee: Monsanto Company, St. Louis, Mo.

[21] Appl. No.: 553,594

[22] Filed: Nov. 21, 1983

[51] Int. Cl.³ .............................................. B32B 5/32
[52] U.S. Cl. ...................................... 428/286; 156/77; 156/78; 428/288; 428/296; 428/316.6; 428/317.1; 428/319.3; 428/319.7
[58] Field of Search ................... 156/77, 78; 428/246, 428/282, 286, 287, 288, 296, 304.4, 314.4, 314.8, 316.6, 317.1, 317.5, 317.7, 318.4, 319.3, 319.7

[56] References Cited

U.S. PATENT DOCUMENTS

| | | | |
|---|---|---|---|
| 3,355,535 | 11/1967 | Hain et al. | 428/316.6 |
| 3,531,367 | 9/1970 | Karsten | 428/317.7 |
| 3,565,746 | 2/1971 | Stevens | 428/316.6 |
| 3,787,259 | 1/1974 | Kleinfeld et al. | 428/286 |
| 3,817,818 | 6/1974 | Riding et al. | 428/316.6 |
| 3,833,259 | 9/1974 | Pershing | 428/316.6 |
| 4,065,596 | 12/1977 | Groody | 428/246 |
| 4,147,828 | 4/1979 | Heckel et al. | 428/316.6 |
| 4,167,824 | 9/1979 | Wolpa | 428/316.6 |
| 4,388,363 | 6/1983 | Fountain | 428/319.3 |

FOREIGN PATENT DOCUMENTS 2906259 8/1980 Fed. Rep. of Germany ... 428/319.7

Primary Examiner—William J. Van Balen
Attorney, Agent, or Firm—Lawrence L. Limpus

[57] ABSTRACT

A thermoformable laminate structure with improved acoustical absorption is provided which has a first and a third layer of foamed thermoplastic material and a second layer, intermediate the first and third layers, which is a material having acoustical properties different from the properties of the material of the first and third layers. A portion of the surface area of each layer is adhesively bonded to the adjacent layer. A resin impregnated fabric is bonded to the outer surfaces of the first and third layers.

14 Claims, 3 Drawing Figures

THERMOFORMABLE LAMINATE STRUCTURE WITH IMPROVED ACOUSTICAL ABSORPTION

This invention relates to thermoplastic materials, and particularly to materials comprising foamed themoplastic resins having substantially improved sound attenuation properties. More particularly this invention relates to a laminate structure formed from at least two foamed thermoplastic resins which exhibits improved sound absorption characteristics. This invention also relates to a thermoplastic laminate structure which may be molded into complex shapes while retaining its sound absorbing qualities. This invention also relates to the use of the laminate of this invention in motor vehicles to provide a quieter passenger compartment.

DESCRIPTION OF THE PRIOR ART

It has been desired for many years to reduce the noise impinging upon individuals at home, at work, and in the multitude of other places in which people find themselves. This effort has, of course, included efforts to reduce the noise within the vehicles used in transportation, for example, in automobiles, buses and airplanes.

For many years increasing the mass density of a wall was considered as being the only way to improve the sound attenuation characteristic of structures. It was then found that separating the two halves of the wall construction produced a slight degree of sound reduction and filling the cavity between the two halves with a low density soundwave-absorbing membrane such as mineral wool further increased the sound reduction. A further increase in the reduction of sounds in structures was realized when it was found that thermoplastic foams when constructed in certain forms have a degree of sound resistance and inhibit to some extent the transmission of noise from one area to an adjacent area. However, it is also known that current thermoplastic foam constructions are subject to resonant short-comings which create areas where substantial loss of sound attenuation occurs throughout a broad frequency spectrum.

A similar development was taking place in the field of transportation. The first attempt at decorating within an automobile, for example, consisted of support rods on the interior surface of the automobile roof which supported a fabric to cover the roof material. This construction is still in use today; however, a sound absorbing material such as mineral wool is often installed between the fabric and metal roof of the automobile. For many years a pressed board made of a formable resin material has also been used in automobiles as the headliner, the material covering the interior of the automobile roof. The pressed board has been painted for decoration or a softer decorative trim has been mechanically attached or bonded to the pressed board.

Foamed thermoplastic laminates have also been used in automobiles, particularly in the headliners. These foamed thermoplastic laminates were most often formed as a sandwich structure in which the foamed thermoplastic material was enclosed between liner board facings. An example of this construction is the Fome-Cor" board produced by Monsanto Company which is a polystyrene foam which has a kraft liner board facing on each side. The Fome-Cor" board would be prepared for use by die-cutting and scoring or by pressing the board and applying a resin to fix the pressed shape. A decorative trim was often applied to the automotive interior side of the headliner. This decorative trim has typically been a thin layer of polyurethane foam covered with cloth or vinyl.

A very similar material is also in use today for headliners in automobiles. A thermoplastic sandwich is formed with a thermoplastic polymer skin. A layer of foamed styrene-maleic anhydride polymer is bonded to the interior of the thermoplastic sandwich and a themoplastic polymer skin covers the foamed styrene-maleic anhydride polymer. A decorative trim, identical to that described above, is applied to the interior side of the automobile headliner.

The most recent effort to reduce the sound level within automobiles is the use of molded fiberglass which contains a phenol-formaldehyde polymer as a binder. A rayon scrim is attached to one side of a fiberglass batt and is compression molded to the desired automotive headliner shape. As with the others, a decorative trim, a thin foamed polyurethane layer covered with cloth or vinyl, is added to the side of the headliner which faces the automotive interior.

SUMMARY OF THE INVENTION

It is an object of this invention to provide a moisture-resistant thermoformable laminate structure with improved acoustical absorption.

It is a further object of this invention to provide a thermoformable laminate structure formed from foamed resins which have non-woven polymeric skins.

It is yet another object of this invention to provide a thermoplastic laminate structure which may be molded into complex shapes while retaining its sound absorbing qualities.

An additional object of this invention is to provide a thermoformable laminate structure with improved acoustical qualities which may be used in motor vehicles to provide a quieter passenger compartment.

These and other objects are obtained by the thermoformable laminate structure of this invention and the use of that structure as described hereinafter.

The thermoformable laminate structure of this invention has first and third layers of a foamed thermoplastic material which have an inner surface and an outer surface. A second layer of material, which has different acoustical characteristics from the foamed thermoplastic material of the first and third layers, is intermediate the first and third layers and at least a portion of the second layer is adhesively bonded to the inner surfaces of the first and third layers of thermoplastic material. A resin impregnated fabric is adhesively bonded to the outer surfaces of the first and third layers of thermoplastic material. A thermoformable synthetic polymer resin is used to impregnate the fabric.

The thermoformable laminate structure of this invention may be further described as having first and third layers of a foamed thermoplastic material, such as foamed polystyrene, which have an inner surface and an outer surface. A second layer of material, such as foamed polyurethane or foamed polystyrene which is treated to have acoustical properties different from the properties of the foamed thermoplastic material which forms the first and third layers, is intermediate the first and third layers of thermoplastic material. At least a portion of the second layer is adhesively bonded to the inner surfaces of the first and third layers of thermoplastic material. A resin impregnated spun-bonded, non-woven polyester fabric is adhesively bonded to the outer surfaces of the first and third layers of thermoplastic material. A thermoformable synthetic polymer resin, such as phenolic or acrylic resins, is used to impregnate the fabric.

The laminate of this invention may be molded into complex shapes, for example, for use as an automobile headliner, the covering for the interior surface of the automobile roof. The thermoplastic materials used for the first, second, and third layers of thermoplastic material can be molded and the resin applied to the outer surfaces of the laminate structure provides heat and moisture resistance to protect the laminate structure and provides strength and rigidity to the completed molded laminate.

DESCRIPTION OF THE PREFERRED EMBODIMENT

Figure 1:
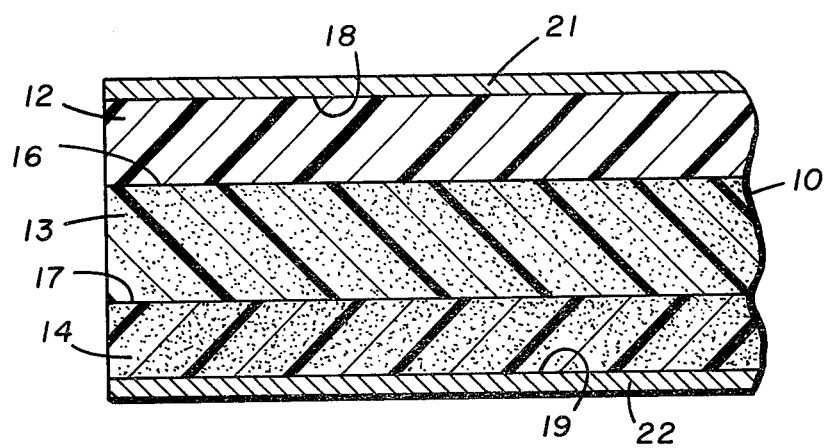
FIG. 1 is a side view of the laminate structure of this invention.

Turning now to FIG. 1, a side view of the thermoformable laminate structure of this invention is shown. The laminate structure 10 has a first layer of thermoplastic material 12 and third layer of thermoplastic material 14. In the following description, both the first layer 12 and third layer 14 are fabricated from the same thermoplastic material; however, the first and third layers may be fabricated from different thermoplastic materials. A second layer of material 13 is located intermediate the first and third layers of thermoplastic material 12 and 14. It is preferred that the second layer 13 be fabricated from a second thermoplastic material, that is a material different from the material used for the first layer 12 and the third layer 14. The thermoplastic materials utilized for the first layer 12, second layer 13, and third layer 14 are produced as a foamed material in a manner that is well-known and will not be further described herein. The first layer 12 and third layer 14 of thermoplastic material each have an inner surface, 16 and 17 respectively, and an outer surface, 18 and 19 respectively. The inner surface 16 of first layer 12 and the inner surface 17 of third layer 14 are in contact with the surfaces of second layer 13 which is located intermediate the first and third layers 12 and 14 and the surfaces are bonded together. This bonding is most easily achieved by applying an adhesive to the surfaces before the surfaces come in contact with one another. The adhesive may coat the entire surface area of inner surface 16 and inner surface 17, as well as the surfaces of the second layer of thermoplastic material 13; however, it is preferable that the adhesive only be applied to a portion of the surfaces such that only a portion of the second layer 13 is bonded to the first layer 12 and third layer 14 while the remainder of the surfaces are adjacent to and in contact with each other, but are not adhesively bonded to one another. A resin impregnated fabric 21 is adhesively bonded to the outer surface 18 of first layer 12 and a second resin impregnated fabric 22 is adhesively bonded to the outer surface 19 of third layer 14. Preferably the resin impregnated fabrics bonded to outer surface 18 and outer surface 19 are identical; however, it is possible that the fabrics or the resin or both may be different. The fabric is preferably spunbonded, non-woven polyester material, but nylon or other fabric could also be used. The resin used to impregnate the fabric is a thermoformable synthetic polymer resin which is preferably an acrylic resin, but which may also be a phenolic resin. It has been determined that the thickness of the first and third layers, 12 and 14, of thermoplastic material has a great effect on the acoustical properties of the finished laminate structure 10. Therefore, it is desired that the first and third layers, 12 and 14, have a thickness within a range of from approximately 0.15 cm thick to approximately 1.25 cm thick and it is preferred that the thickness be within a range of from approximatley 0.30 cm thick to approximately 0.65 cm thick.

The second layer 13 of material is fabricated from a material different from that used for the first layer 12 and third layer 14 to have different acoustical properties. Alternatively, the same material may be used if it has been treated or formed by a process to have different acoustical characteristics from the materials used for the first layer 12 and third layer 14. A preferred material for fabrication of the second layer 13 is polyurethane and specifically a foamed polyurethane. While the material itself is known, its use in the sandwich-like construction of this invention has been found to provide a greater degree of resistance to the transmittal of sound, that is, the laminate structure has enhanced acoustical properties and has increased the noise reduction that can be achieved. It is also possible to use materials such as foamed polystyrene, foamed polyvinyl-chloride and foamed polyethylene, or batts of polypropylene or polyester fibers for the second layer 13. As with the first layer 12 and third layer 14, the thickness of the second layer 13 of thermoplastic material is critical. The thickness of second layer is desired to be within a range of from approximately 0.15 cm to approximately 2.50 cm and it is preferred that the thickness of the second layer 13 be within a range of from approximately 0.30 cm to approximately 1.25 cm. Second layer 13 is positioned intermediate first layer 12 and third layer 14. It is possible that the layers of material may be placed adjacent to and in contact with one another without bonding the layers to one another and, in such a configuration, a certain amount of sound absorption or reduction may be achieved. However, it has been found that if the three layers of material are adhesively bonded to one another, the acoustical properties of the laminate are greatly enhanced. The adhesive may coat the entire surface area of inner surface 16 and inner surface 17 as well as the surfaces of the second layer of thermoplastic material 13; to provide complete bonding of the three layers of thermoplastic material to one another. While applying the adhesive to the entire surface area of inner surfaces 16 and 17 and the surfaces of second layer 13 to adhesively bond the first layer 12 and third layer 14 to the second layer 13 will produce a laminate having improved accoutiscal properties, it has found to be preferable to apply the adhesive to only a portion of the surface areas to be bonded together such that only a portion of the second layer 13 is bonded to the first layer 12 and third layer 14 and the remainder of the surface area is in contact but not bonded together. When the adhesive is applied to only a portion of the surface area, the portion being from approximately 20% to approximately 60% of the total surface area of each of the surfaces which are to be adhesively bonded, the laminate structure 10 exhibited superior acoustical properties, that is a higher degree of absorption, reduction or attenuation of noise, than was exhibited by the aforementioned laminate in which the entire surface areas were adhesively bonded.

A resin impregnated fabric 21 is adhesively bonded to the outer surface 18 of first layer 12 and a second resin impregnated fabric 22 is adhesively bonded to the outer surface 19 of third layer 14. Preferably the resin impregnated fabrics 21 and 22 are the same; however, the fabrics, the resin, or both may be different. It is preferred that the fabric be a spun-bonded, non-woven polyester fabric. While the polyester fabric is preferred, non-woven, spun-bonded nylon materials such as Cerex" spun-bonded nylon produced by Monsanto Company and woven materials such as polyesters, polyester-cotton blends, and nylons are also satisfactory. The fabric is impregnated with a resin which is preferably a synthetic polymer resin chosen for its stability and reproducibility. For this service acrylic resins are preferred although phenolic resins are equally serviceable. The acrylic resins are preferred because they contain no formaldehyde and they are thermoplastic so that the curing operation required for phenolic resins is eliminated. The acrylic resins must be capable of withstanding high heat, greater than 75° C., and have a high moisture resistance. In addition, they must be thermoformable because the laminate structure 10 is made of thermoplastic materials which can be heated and reshaped in a molding process. When a phenolic resin is used, the resin is dried to a "B stage", that is, a partially cured state in which the resin is touchable but remains slightly tacky. During the molding process in which the laminate structure 10 is molded into a final shape, the high heat provides a final cure to the phenolic resins which harden and are no longer formable. Either resin may be applied to the fabric by an aqueous solution, but a methanol solution may be used for application of the acrylic resins. The resin dispersant liquid is removed through heating prior to using the resin impregnated fabric 21 and 22 in the production of the laminate structure 10.

Figure 2:
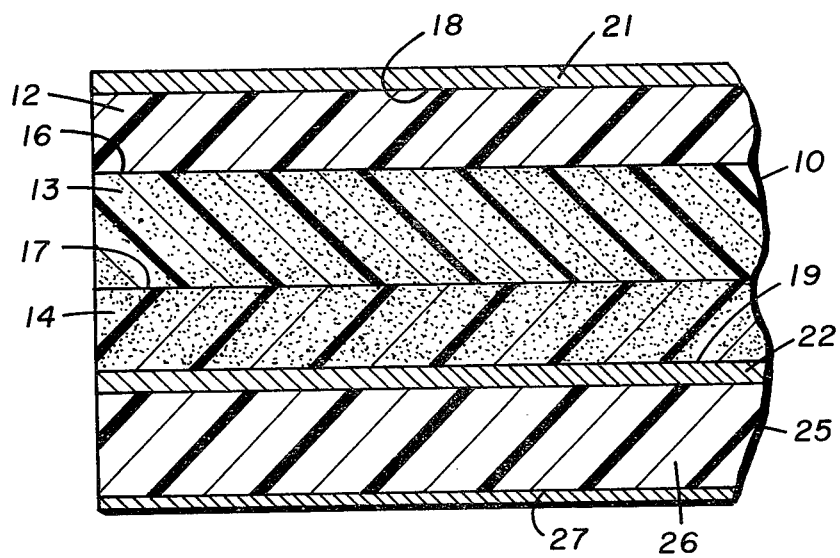
FIG. 2 is a side view of the laminate structure of this invention with the decorative trim that is added when such a structure is utilized as an automotive headliner.

When the laminate structure of this invention is utilized in the manufacture of headliners for use in automobiles, a decorative trim is applied to the surface facing the interior of the automobile. FIG. 2 shows the laminate structure 10 of this invention with the decorative trim applied. The laminate structure 10 shown in FIG. 2 is identical to the laminate structure shown in FIG. 1 and the corresponding parts of the laminate structure shown in each of FIG. 1 and FIG. 2 are given the same numbers. The laminate structure 10 is adequately described hereinabove. The decorative trim 25 is adhesively bonded to the resin impregnated fabric 22 on the outer surface 19 of the third layer 14 of thermoplastic material which is a part of the laminate structure 10. The decorative trim 25 has two components, a thin polyurethane foam layer 26 which provides cushioning on the inside of the automotive headliner and covers any seams, ridges, cracks, or other blemishes in the laminate structure 10 to provide a smooth appearance to the inside of the headliner and a cloth covering 27 which is adhesively attached to the polyurethane layer 26 to complete the decorative trim 25. While the decorative trim 25 is desirable for the appearance of the headliner when installed within an automobile, the decorative trim 25 also increases the acoustical properties of the laminate structure 10.

Figure 3:
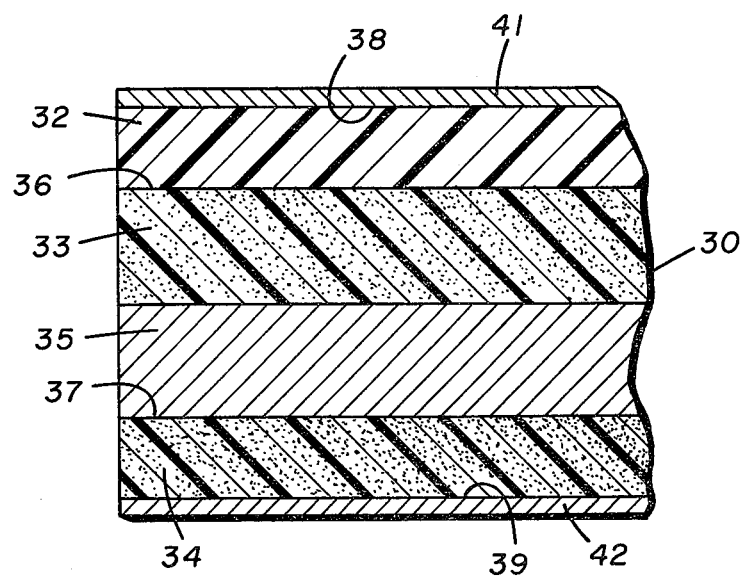
FIG. 3 is a side view of a second embodiment of the laminate structure of this invention.

Turning now to FIG. 3, a second embodiment of the laminate structure of this invention is shown. FIG. 3 shows laminate structure 30 which includes many parts identical to those disclosed and discussed in conjunction with laminate structure 10 shown in FIG. 1 and further includes fourth layer 35, a batt of polyester fibers. Laminate structure 30 has a first layer of thermoplastic material 32, a third layer of thermoplastic material 34, and a second layer of material 33 located intermediate the first layer 32 and the third layer 34. These three layers of materials correspond to the first layer 12, third layer 14 and second layer 13 respectively shown in FIG. 1 and discussed hereinabove. The descriptions of the first, second and third layers of material shown in FIG. 1 are equally descriptive of the layers of material used in laminate structure 30. First layer 32 and third layer 34 have inner surfaces 36 and 37 respectively and outer surfaces 38 and 39 respectively. A resin impregnated fabric 41 is adhesively bonded to the outer surface 38 of first layer 32 and resin impregnated fabric 42 is adhesively bonded to the outer surface 39 of third layer 34. The resin impregnated fabrics 41 and 42 correspond to the fabrics 21 and 22 shown in FIG. 1 and the description of those fabrics is equally applicable here. Second layer 33, unlike second layer 13 shown in FIG. 1, is not adhesively bonded to the third layer 34. In addition to the second layer of material 33 located intermediate first and third layers 32 and 34, laminate structure 30 has a fourth layer 35 positioned intermediate the first and third layers 32 and 34. In FIG. 3 second layer 33 is shown adjacent to the inner surface 36 of first layer 32 and fourth layer 35 is adjacent the inner surface 37 of third layer 34; however, the relative positions of the second and fourth layers 33 and 35 may be reversed such that fourth layer 35 will be adjacent first layer 32 and second layer 33 will be adjacent third layer 34. The fourth layer 35, unlike the other layers present in the laminate structure 30, is not a foam material, but is instead a batt of fibers which may be held together by a binder such as a phenolic resin. The batt of fibers is preferably made of polyester fibers but may be made of other fiberous materials. While the batt of fibers is preferred for the fourth layer 35, it is possible to use a fourth layer of foamed thermoplastic material in the laminate structure 30. As in the discussion of the laminate structure 10 shown in FIG. 1, it is preferred that the adjacent surfaces of the four layers, 32, 33, 34 and 35, in laminate structure 30 be adhesively bonded together but that they not be adhesively bonded on the entire surface areas. The acoustical properties, the ability to absorb, reduce or attenuate noise, are enhanced if only a portion of each surface is adhesively bonded to the adjacent surface. The adhesively bonded portion of the surfaces should range from approximately 20% to approximately 60% of the surface area and it is preferred that only approximately 35% to approximately 50% of the surface area of each of the surfaces be adhesively bonded to the adjacent surface for the greatest acoustical properties. When the laminate structure 30 is used as an automotive headliner, decorative trim is added as shown and described in FIG. 2.

The advantages and improved acoustical properties of the laminate structure of this invention may be seen in the following examples and table.

EXAMPLE I

In Example I the acoustical absorption coefficients of a polystyrene foam board, two laminate structures which are constructed in accordance with the teachings of this invention, but are not adhesively bonded, and a fiberglass headliner of the type now used in automobiles were compared. The acoustical absorption coefficient for a material is the percentage of the sound that will be absorbed by that material. In each example, the tests for the acoustical absorption coefficient were performed in accordance with the American Society for Testing and Materials (ASTM) Standard C384-77 (impedance tube).

The polystyrene foam board was a 0.30 cm thick foamed polystyrene. A kraft liner board facing was laminated to each side of the foamed polystyrene board. A decorative trim, formed as a 0.65 cm thick foamed polyurethane layer with a cloth covering, was adhesively bonded to one side of the polystyrene board.

The fiberglass headliner was formed as a fiberglass batt with a rayon scrim attached to one side of the batt. A decorative trim, a 0.65 cm thick polyurethane layer covered with cloth, was adhesively bonded to the side of the fiberglass batt opposite the rayon scrim. The fiberglass headliner, including the decorative trim, had a total thickness of approximately 1.90 cm.

Sample 1 was formed as a laminate structure having first and third layers of polystyrene foam 0.38 cm thick with a second layer of polyurethane foam 0.65 cm thick intermediate the first and third layers of polystyrene. Each layer was placed in physical contact with the adjacent layer but the layers were not adhesively bonded together. The outer surfaces of the first and third layers were covered by a resin impregnated, spunbonded, non-woven fabric. Decorative trim, 0.65 cm of polyurethane with a cloth covering, was placed adjacent the outer surface of the first layer of polystyrene.

Sample 2, a laminate structure similar to Sample 1, was constructed in accordance with the alternate teachings shown in FIG. 3. First and third layers of polystyrene foam were 0.38 cm thick. The outer surfaces of the first and third layers were covered by a resin impregnated, spunbonded, non-woven fabric. A second layer was formed of 0.65 cm thick polyurethane foam and was located between the first and third layers of polystyrene and adjacent to the inner surface of the third layer. A fourth layer, formed as a 0.65 cm thick batt of polyester fibers was positioned between the first layer of polystyrene foam and the second layer of polyurethane foam. The batt of polyester fibers was treated with a phenolic resin to maintain its shape and continuity, that is, to provide a uniform batt. A decorative trim of 0.65 cm thick polyurethane covered by a cloth was placed on the outer surface of the first layer of polystyrene foam.

It is taught in this invention that the layers that form the laminate structure be bonded by adhesive over at least a portion of their surface areas; however, for the purposes of Example I, the layers which form the laminate structures of Sample 1 and Sample 2 were laid adjacent to and in physical contact with one another, but were not adhesively bonded. The results of the test for the acoustical absorption coefficients are shown in Table 1.

EXAMPLE II

In Example II the acoustical absorption coefficients of two additional samples of a laminate structure constructed in accordance with the teachings of this invention were determined.

Sample 3 was similar to the laminate structure of Sample 1. The first and third layers were polystyrene foam 0.38 cm thick. The outer surfaces of the first and third layers were covered by a resin impregnated, spunbonded, non-woven fabric. A second layer of polyurethane foam 0.65 cm thick was positioned between the first and third layers of polystyrene foam and was adhesively bonded to each. A decorative trim formed of polyurethane foam 0.65 cm thick was positioned against the outer surface of the first layer of polystyrene foam.

Sample 4 was constructed similarly to Sample 3. First and third layers were formed of polystyrene foam 0.38 cm thick. The outer surfaces of the first and third layers were covered by a resin impregnated, spunbonded, non-woven fabric. A 0.65 cm layer of polyurethane foam was positioned intermediate the first and third layers of polystyrene foam. A decorative trim of 0.65 cm thick polyurethane foam was positioned against the outer surface of the first layer of polystyrene foam. For Sample 4 the layers which form the laminate structure were adhesively bonded to one another; but, only a portion of the surfaces were bonded to one another such that approximately 35% of the total surface area was adhesively bonded.

The results of the acoustical absorption tests for Samples 3 and 4 are shown in Table I.

EXAMPLE III

For Example III the laminate structure, Sample 5, was constructed using a reticulated polyurethane foam coated with polyvinyl chloride (PVC) for the intermediate layer of material. The laminate was constructed having first and third layers of polystyrene foam 0.38 cm thick. The outer surfaces of the first and third layers were covered by a resin impregnated, spunbonded, non-woven fabric. A second layer of 0.95 cm thick polyurethane foam coated with PVC was intermediate the first and third layers and was adhesively bonded to each. A decorative trim, 0.65 cm thick polyurethane foam, was bonded to the outer surface of the first layer of polystyrene. The results of the test for the acoustical absorption coefficent for Sample 5 are shown in Table 1.

EXAMPLE IV

Three additional samples were tested for Example IV. Most polystyrene foam exhibits relatively poor sound absorption characteristics. However, polystyrene foam can be made to exhibit very good sound absorption characteristics if the passageways between the cells are opened sufficiently to allow sound to pass through the cells instead of immediately being reflected. When treated to open the cells, the polystyrene foam can best be described as a reticulated material. The laminate structures made for Example IV used this treated polystyrene foam in place of the polyurethane foam used in the prior Examples. This treated polystyrene foam can be created using any of several methods which will not be discussed here.

Sample 6 was a single layer of polystyrene foam 1.25 cm thick. The foam was very coarse and was treated to open passageways between the cells of the polystyrene. A 0.65 cm thick polyurethane foam layer was bonded to the layer of polystyrene foam as a decorative trim.

Sample 7 was a single layer of polystyrene foam 1.25 cm thick with a 0.65 cm thick polyurethane foam layer bonded to the layer of polystyrene foam as a decorative trim. Unlike Sample 6, Sample 7 was not treated to open the passageways between the cells of the polystyrene foam.

Sample 8 was a laminate structure constructed in accordance with this invention. Sample 8 had first and third layers of polystyrene foam 0.30 cm thick. The outer surfaces of the first and third layers were covered by a resin impregnated, spunbonded, non-woven fabric. A second layer, intermediate the first and third layers, was polystyrene foam 0.65 cm thick which had the cells opened further. A decorative trim of 0.65 cm thick polyurethane foam was bonded to the outer surface of the first layer of polystyrene foam.

Sample 9 was identical to Sample 8 except that the second layer in Sample 9 was treated polystyrene foam 1.25 cm thick.

The results of the test performed on Samples 6, 7, 8 and 9 to determine their acoustical absorption coefficients are shown in Table 1. The opening of the cells in the polystyrene foam greatly increased the acoustical absorption properties of the material.

TABLE I

| | Acoustical Absorption Coefficients ($a_N$) | |
|---|---|---|
| Material | Low Frequency Noise | High Frequency Noise |
| Polystyrene Board | 0.06 | 0.14 |
| Fiberglass | 0.12 | 0.46 |
| Sample 1 | 0.05 | 0.43 |
| Sample 2 | 0.13 | 0.70 |
| Sample 3 | 0.20 | 0.42 |
| Sample 4 | 0.08 | 0.82 |
| Sample 5 | 0.30 | 0.41 |
| Sample 6 | 0.02 | 0.16 |
| Sample 7 | 0.04 | 0.12 |
| Sample 8 | 0.02 | 0.50 |
| Sample 9 | 0.02 | 0.50 |

From Table I it can be seen that the laminate structure of this invention demonstrates acoustical properties which are equal to or better than the fiberglass headliners and the polystyrene foam board. The higher the coefficient shown in Table I, the greater the sound absorption exhibited by the material being tested. Samples 3, 4 and 5 which most clearly represents the teachings of this invention are generally superior in their acoustical properties at both the low frequency noise and at the high frequency noise. The sound frequencies utilized in these tests were selected to represent the low frequency noise and the high frequency noise typically found within an automobile as it is driven. The low frequency noise was approximately 500 hertz with a testing range from approximately 10 hertz to approximately 700 hertz. The high frequency noise was nominally considered to be 1000 hertz, but the laminated structures were tested within a range of from approximately 750 hertz to approximately 4000 hertz. In addition to the better acoustical properties, the laminate structure of this invention provides a benefit to the automotive industry by being slightly lighter than the fiberglass headliner now in use.

Two theories have been considered to explain why the laminate structure of this invention achieves better acoustical properties than, for example, the fiberglass headliner now in use in automobiles. The first explanation is that the first and third layers are transparent to the low frequency sound which then passes through the first and third layers and is trapped within the second layer in the center of the laminate structure. The second explanation is that the second layer separates the first and third layers of thermoplastic material and that the sound is trapped between the first and third layers and bounces repeatedly between them until it is dissipated. There may, of course, be other explanations for the improved acoustical absorption properties.

As will be apparent to those skilled in the art the inventive concept set forth herein can find many applications in the art of moldable, thermoformable laminate structures and many variations on and modifications to the embodiments described above may be made without departure from the spirit and scope of this invention.

We claim:

1. A thermoformable laminate structure with improved acoustical absorption comprising:
   a first layer of a foamed thermoplastic material;
   a third layer of a foamed thermoplastic material;
   a second layer intermediate said first and third layers, said second layer being a material having acoustical properties different from the acoustical properties of the thermoplastic material of said first and third layers;
   at least a portion of said first and second and said second and third layers being adhesively bonded together; and
   said first and third layers of thermoplastic material having an outer surface, said outer surface having a resin impregnated fabric bonded thereto.

2. The thermoformable laminate structure of claim 1 wherein said first and third layers of foamed thermoplastic material are foamed polystyene.

3. The thermoformable laminate structure of claim 1 wherein said second layer of material is selected from a group consisting of foamed polyurethane, foamed polystyrene, foamed polyurethane coated with polyvinylchloride, and foamed polyethylene.

4. The thermoformable laminate structure of claim 3 wherein said second layer of material is a foamed polyurethane.

5. The thermoformable laminate structure of claim 1 wherein said second layer of material is a batt of polyester fibers.

6. The thermoformable laminate structure of claim 1 wherein said resin impregnated fabric comprises a non-woven fabric impregnated with a synthetic polymer resin.

7. The thermoformable laminate structure of claim 6 wherein said non-woven fabric is a polyester or nylon.

8. The thermoformable laminate structure of claim 6 wherein said non-woven fabric is spunbonded.

9. The thermoformable laminate structure of claim 6 wherein said synthetic polymer resin is a moldable phenolic resin.

10. The thermoformable laminate structure of claim 6 wherein said synthetic polymer resin is a thermoformable acrylic resin.

11. The thermoformable laminate structure of claim 1 wherein said adhesively bonded portions of said first and second layers and said second and third layers comprise between approximately twenty percent and approximately sixty percent of the surface area of the adjacent surface.

12. A thermoformable laminate structure with improved acoustical absorption comprising:
   first and third layers of a thermoplastic material, said thermoplastic material being a foamed polystyrene, said first and third layers having an inner surface and an outer surface;
   a second layer of foamed material, said second layer of foamed material being a foamed polyurethane, said second layer being intermediate said first and third layers and a portion of said second layer being bonded to said inner surface of said first and third layers of themoplastic material; and
   a resin impregnated fabric adhesively bonded to said outer surfaces of said first and third layers of thermoplastic material, said fabric being a non-woven polyester, and said resin being a thermoformable synthetic polymer resin.

13. The thermoformable laminate structure of claim 12 wherein said portion of said second layer of foamed material is adhesively bonded to said inner surfaces of said first and third layers of thermoplastic material.

14. The thermoformable laminate structure of claim 13 wherein said adhesively bonded portion of second layer is between approximately twenty percent and approximately sixty percent of the surface area of said second layer.

* * * * *